Figure 1:
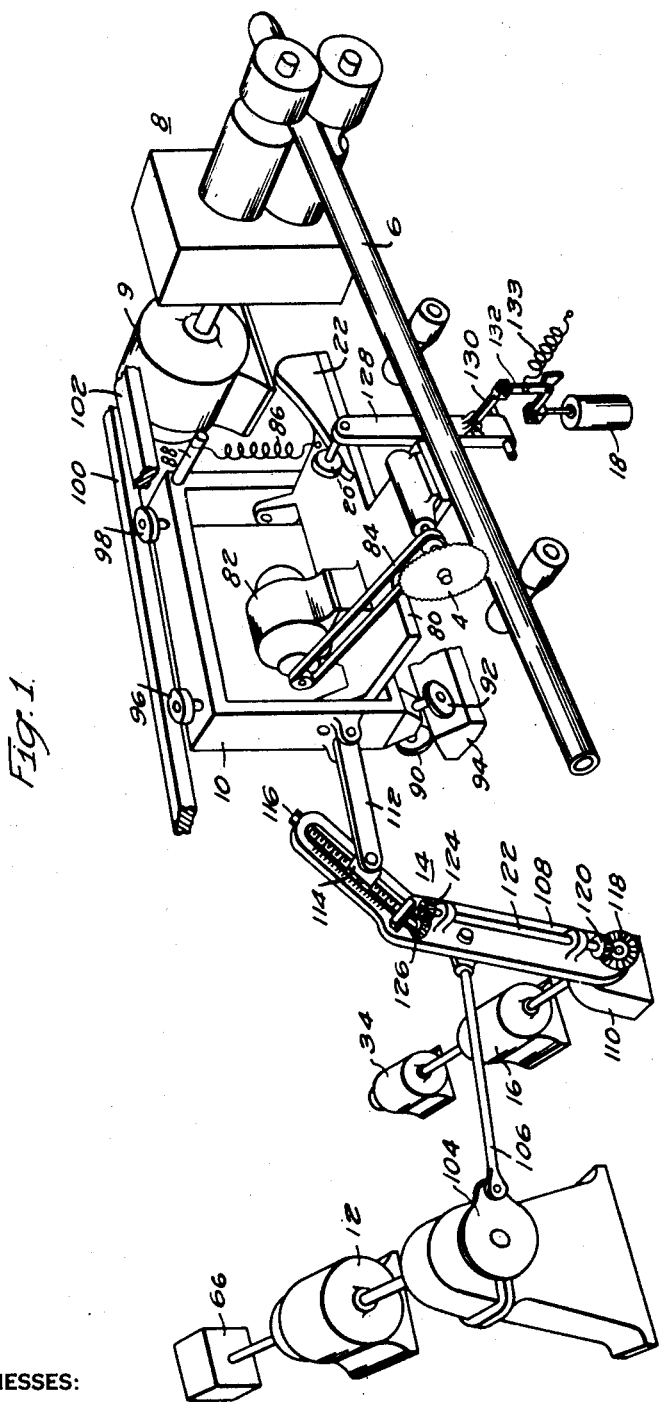

Feb. 21, 1950

W. G. COOK 2,498,249

ADJUSTABLE COUNTING RELAY SYSTEM

Filed April 19, 1941

3 Sheets-Sheet 1

WITNESSES:
E. A. McCloskey.
Joe Weber.

INVENTOR
Willard G. Cook.
BY
G. M. Crawford
ATTORNEY

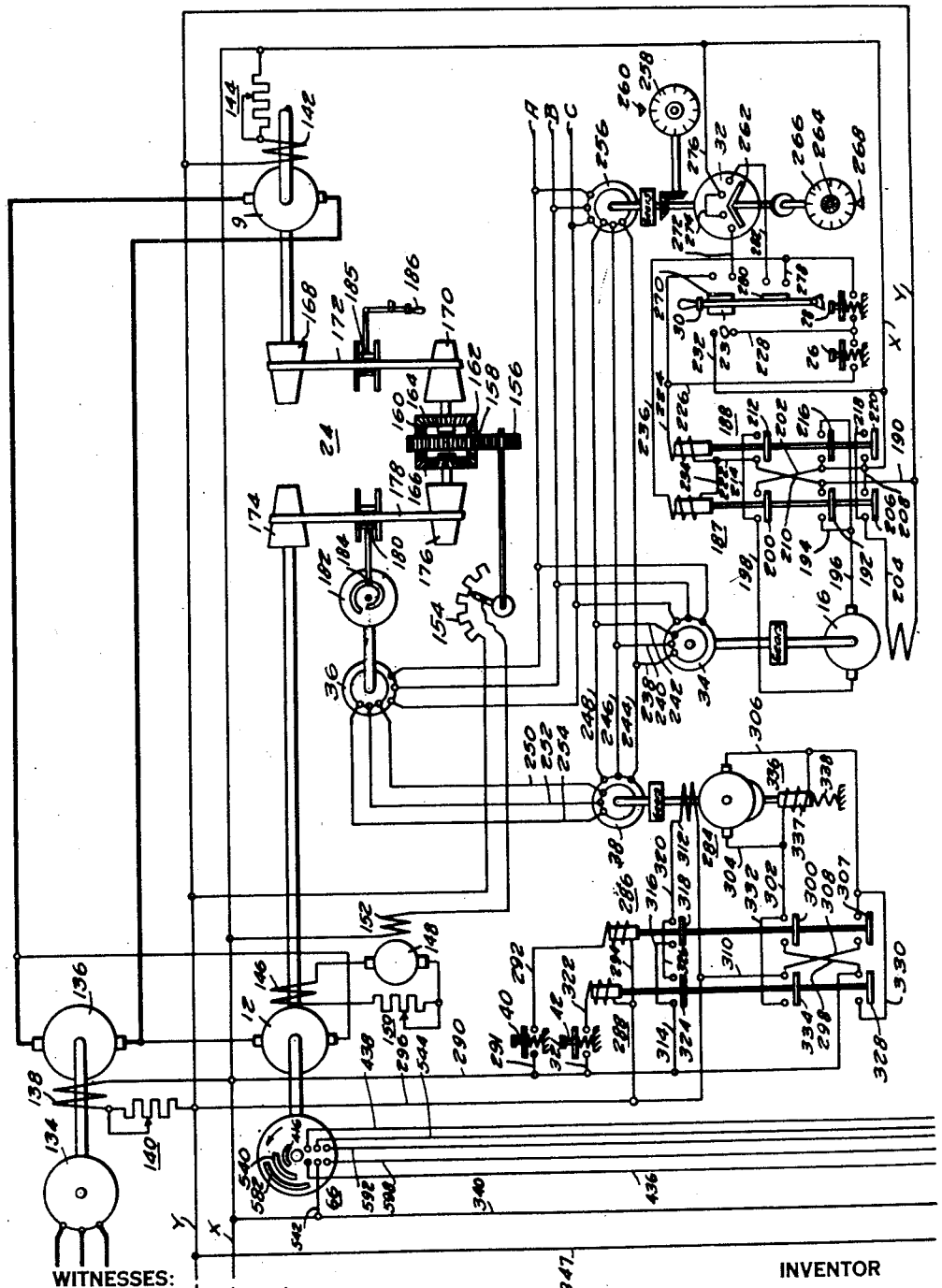

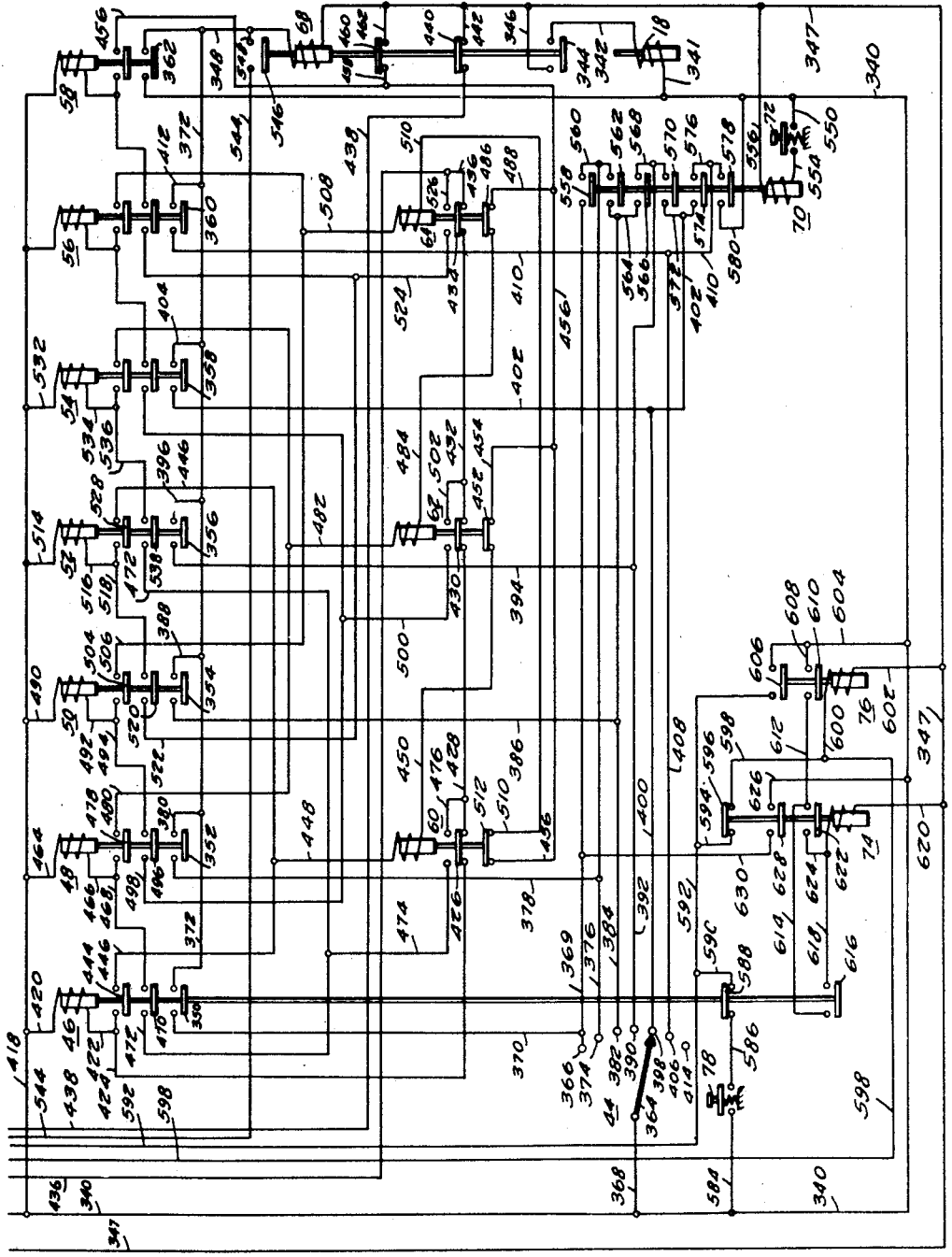

Patented Feb. 21, 1950

2,498,249

UNITED STATES PATENT OFFICE 2,498,249

ADJUSTABLE COUNTING RELAY SYSTEM

Willard G. Cook, Wilkinsburg, Pa., assignor to Westinghouse Electric Corporation, East Pittsburgh, Pa., a corporation of Pennsylvania Application April 19, 1941, Serial No. 389,346

16 Claims. (Cl. 175—320)

My invention relates, generally, to control systems and, more particularly, to systems for controlling the operation of a device which may be utilized to act upon a length of moving material as it passes through or is acted upon by a work device.

In the manufacture of pipe, for example, it is necessary that the pipe be cut into the desired lengths as it is delivered continuously from the pipe mill, and it is necessary that any desired preselectable lengths be cut continuously and that the selected lengths be of uniform dimension.

An object of my invention is to provide a control system for a continuously operating cut-off saw which shall function to cause the saw to automatically cut any desired preselectable sections of a length of material as the material is continuously fed to the saw, which may be made to cut a test piece from the length of material after any desired section has been cut, and which may be made to cut the material into short lengths in an emergency such as would make it undesirable to continue to cut the material into the preselected lengths.

Another object of the invention is to provide a control system for a continuously operating cut-off saw which shall function to cause the speed of travel of the saw to be coordinated with the speed of a moving length of material which is to be cut by the saw and which may be adjusted to compensate for any inaccuracies in speed matching to more accurately coordinate the saw speed with the speed of the length of material.

A further object of the invention is to provide a control system for a device for operating upon a moving length of material which shall function to cause the device to automatically act upon the length of material at any desired preselectable, regular, successive lengths along the material, which may be made to act upon the material after any of the regular preselected lengths of material have been acted upon, and which may be made to act upon the material at shorter intervals than the preselected lengths in an emergency such as would make it undesirable to continue to act upon the material at the preselected lengths.

These and other objects and advantages of the invention will be apparent from the following detailed description taken in connection with the accompanying drawings, in which:

Figure 1 is a perspective view, partly broken away, of a continuously operable cut-off saw embodying certain of the control elements of the preferred embodiment of the invention; and Figs. 2 and 3, interconnected as indicated, comprise a wiring diagram for a control system for a cut-off saw such as that shown in Fig. 1 and embodying the principal features of the invention.

In practicing the invention, a saw 4 is disposed to act upon a moving length of material, such as a pipe 6, as it is continuously delivered from a pipe mill 8 which is driven by a motor 9. The saw 4 is mounted upon a carriage 10 which may be reciprocated by a motor 12 through a linkage 14. The effective radius of the linkage 14 may be varied by a motor 16 to compensate for changes in the period of reciprocation of the saw which may be effected by control of the speed of the carriage drive motor 12, to thereby maintain equal saw and pipe speeds at all frequencies of reciprocation of the saw. A saw-operating solenoid 18 functions to cause a follower 20 to engage a cam 22 during a portion of any desired forward motion of the saw carriage to cause the saw to engage and cut the pipe.

A control system for synchronizing and maintaining synchronism between the speeds of the pipe 6 and the forward motion of the saw 4 and for selecting and automatically controlling the cut lengths of the pipe is shown in Figs. 2 and 3, joined together, as indicated by the interconnecting conductors, to form a single control diagram.

A differential speed-responsive regulator 24 functions to maintain the necessary speed relations between the mill motor 9 and the carriage drive motor 12. The effective radius of the linkage 14 may be adjusted by operating the radius adjusting motor 16 in a forward or reverse direction by the selective actuation of manually operable circuit control devices 26, 28 and 30, or a manually actuable limit switch 32 and the circuit control device 30, as shown in Fig. 2.

The motion of the radius adjusting motor 16 is transmitted to the regulator 24 by means of a suitable motion transmitting device, such as a synchro-tie system, comprising synchro-tie units 34 and 36 connected through a synchro-tie unit 38. Manually operable circuit control devices 40 and 42 may be selectively actuated to control means for effecting adjustments of the relative positions of the synchro-tie units 34 and 36 by varying the relative positions of the rotor and stator of the synchro-tie unit 38.

As shown in Fig. 3, a selector device 44 functions in cooperation with counting relays 46, 48, 50, 52, 54, 56 and 58, sequence relays 60, 62 and 64 and associated circuits, and a limit switch 66 driven by the carriage-drive motor 12 to energize a control relay 68 to energize the saw operating solenoid 18 at the desired multiples of reciprocations to produce the desired cut lengths of pipe.

A relay 70 controlled by a manually operable circuit control device 72 functions to cause the saw to make emergency cuts when desired, and the relays 74 and 76 function under the control of a circuit control device 78 to cause the saw to cut a test-piece immediately following the first cut after the control device 78 is operated.

Considering the invention more in detail, the saw 4 is mounted for rotation upon a platform 80 which is pivotally mounted on the carriage 10, as shown in Fig. 1. The saw 4 is driven by a motor 82, also mounted on the platform, by means of a drive belt 84. The platform 80 is biased by a spring member 86 which is connected to the carriage 10 by a supporting arm 88 to normally hold the saw out of engagement with the pipe 6.

The carriage 10 is supported by rollers 90 and 92 on a base member 94, and is held in position by roller members 96 and 98 which engage guide members 100 and 102. The carriage 10 is continuously reciprocated by the carriage motor 12 which drives the linkage 14. The linkage 14 comprises a crank 104 driven by the motor 12 which is connected by a pitman 106 to a lever 108 which is pivotally mounted on a fixed base 110. A pitman 112 extends from the carriage 10 to a block 114 which has screw-threaded engagement with a rod 116. The rod 116 may be rotated to vary the position of the block 114 by means of the motor 16 through gear members 118 and 120, a rod 122 and gear members 124 and 126.

The cam follower 20 is mounted upon a lever 128 which has a suitable fixed pivotal mounting, and which may be actuated by the solenoid 18 through the link members 130 and 132 against the bias of a spring member 133 to move the cam follower 20 into the path of the cam 22 which will cause the platform 80 to tilt downward as it is moved forward, and thereby cause the saw 4 to engage and cut the pipe 6.

The control system for the carriage motor 12, the radius adjusting motor 16 and the cam actuating solenoid 18 is shown in Figs. 2 and 3, and comprises a motor or any other suitable drive means 134 which drives a main generator 136. The field winding 138 of the generator 136 is energized through a variable resistor 140 from any suitable source of direct-current power to which the conductors X and Y are connected. The armatures of the motors 9 and 12 are connected to be energized by the generator 136 in parallel circuit relation as indicated. The field winding 142 of the mill motor 9 is also energized in circuit with a variable resistor 144 from the conductors X and Y. The field winding 146 of the carriage motor 12 is connected to be energized by a continuously driven exciter 148 in circuit with a variable resistor 150. The field winding 152 of the exciter 148 is connected to be energized from the conductors X and Y in circuit with a variable resistor 154.

The variable resistor 154 is connected to be actuated by the regulator 24 through a gear member 156 which is disposed to be actuated by a gear member 158, which in turn is responsive to the movement of the planet gears 160 and 162 when there is any differential between the speeds of the sun gears 164 and 166. The sun gear 164 is driven by the mill motor 9 through a change-speed mechanism comprising cone pulleys 168 and 170 which are connected by a drive belt 172. The sun gear 166 is driven by the carriage motor 12 through a change-speed mechanism comprising cone pulleys 174 and 176 which are connected by a drive belt 178. The speed ratio between the cone pulleys 174 and 176 may be varied by a guide member 180 which controls the position of the belt 178 with respect to the pulleys 174 and 176, and which may be actuated by a cam member 182 which actuates a cam follower 184 which is mechanically connected to actuate the guide member 180. The speed relation between the cone pulleys 168 and 170 may be varied by a guide member 185 which engages the belt 172 and which may be actuated, as desired, by a hand-operated lever 186.

The radius adjusting motor 16 may be selectively operated in a forward or a reverse direction by the energization of relays 187 and 188 which are controlled by the circuit control devices 28 and 26 and the selector switch 30 when the selector switch 30 is in the left-hand position, and alternatively by the limit switch 32 and the selector switch 30 when the selector switch 30 is in the right-hand position. The relay 187 energizes the motor 16 through a circuit which extends from the conductor Y through a conductor 190, the contact element 192 of the relay 187, conductors 194 and 196, the armature of the motor 16, a conductor 198, the contact element 200 of the relay 187, and a conductor 202 to the conductor X. The relay 187 also connects the field winding of the motor 16 in a circuit which extends from the conductor Y through the field winding of the motor 16, a conductor 204, contact element 206 of the relay 187, and a conductor 208 to the conductor X.

When the relay 188 is energized, the armature of the motor 16 is energized with an opposite potential in a circuit which extends from the conductor Y through the conductors 190 and 210, contact element 212 of the relay 188, conductors 214 and 198, the armature of the motor 16, conductor 196, and the contact element 216 of the relay 188 to the conductor X. When the relay 188 is energized, the field winding of the motor 16 is energized with the same potential as when the relay 187 is energized in a circuit which extends from the conductor Y through the field winding of the motor 16, conductors 204 and 218, contact element 220 of the relay 188, and conductor 208 to the conductor X. The relay 188 is energized by the circuit control device 26 through a circuit which extends from the conductor Y through the conductors 190, 210 and 222, the winding of the relay 188, conductors 224 and 226, the contact element of the circuit control device 26, a conductor 228, the contact element 230 of the selector switch 30, and a conductor 232 to the conductor X.

The relay 187 is energized by the actuation of the circuit control device 28 through a circuit which extends from the conductor Y through the conductors 190, 210, 222 and 234, the winding of the relay 187, a conductor 236, the contact element of the circuit control device 28, conductor 228, the contact element 230, and the conductor 232 to the conductor X.

When the radius adjusting motor 16 is actuated, its movement is transmitted to the cam member 182 through the synchro-tie units 34 and 36. The synchro-tie units 34 and 36 comprise wound rotor induction machines which have their stators connected to a suitable source of three-phase power indicated by the conductors A, B and C. The rotor of the synchro-tie unit 34 is connected to the stator of the synchro-tie unit 38, which comprises a wound rotor induction machine similar to the units 34 and 36, by means of conductors 238, 240 and 242 connected to conductors 244, 246 and 248. The rotors of the synchro-tie units 36 and 38 are connected by conductors 250, 252 and 254. A synchro-tie unit 256 has its stator connected to the conductors A, B and C, and its rotor winding connected to the conductors 244, 246 and 248, and, therefore, is moved in synchronism with the synchro-tie unit 34 which is driven by the radius adjusting motor 16. The synchro-tie unit 256 actuates an indicating dial 258 which is suitably calibrated in cut lengths and associated with an indicating pointer 260 and also actuates the limit switch 32.

The alternative system for operating the radius adjusting motor 16 by means of the limit switch 32 comprises a manually operable contact element 262 which may be actuated by a handwheel 264 in either direction to engage the associated contact elements of the limit switch which are actuated by the synchro-tie unit 256 as indicated. The handwheel 264 also actuates a calibrated dial 266 which is associated with an indicating pointer 268 and which may be calibrated in cut lengths similar to the dial 258. When the handwheel 264 is turned in a clockwise direction, it completes a circuit for the relay 188 which extends from the conductor Y through the conductors 190, 210 and 222, the winding of the relay 188, conductor 224, contact element 270 of the selector switch 30, a conductor 272, the contact element 262, and conductors 274 and 276 to the conductor X. The relay 188 will remain energized, and the motor 16 will continue to rotate until the limit switch 32, which is driven by the synchro-tie unit 256, has disengaged its contact elements from the contact element 262.

In a similar manner, when the handwheel 264 is rotated in a counter-clockwise direction, the relay 187 will be energized in a circuit which extends from the conductor Y through the conductors 190, 210, 222 and 234, the winding of the relay 187, the conductor 236, a conductor 278, contact element 280 of the selector switch 30, a conductor 282, the contact element 262, and the conductor 276 to the conductor X, and the motor 16 will rotate in the opposite direction to the extent determined by the setting of the handwheel 264.

The synchro-tie unit 38 constitutes a phase-shifting device for the purpose of making adjustments of the speed ratio adjusting cam 182 by rotating the rotor of the synchro-tie unit 38, and thus changing the phase relation between its windings and, therefore, the phase relation between the rotor windings of the synchro-tie units 34 and 36. The rotor of the synchro-tie unit 38 is connected to be actuated by a motor 284 which may be connected to be energized for rotation in a forward or a reverse direction by relays 286 and 288 which are under the control of circuit control devices 40 and 42, respectively.

When the circuit control device 40 is actuated, an energizing circuit for the relay 286 is completed, extending from the conductor X through conductors 290 and 291, the contact element of the circuit control device 40, a conductor 292, the winding of the relay 286, and conductors 294 and 296 to the conductor Y.

When the relay 286 is actuated, a circuit for the armature of the motor 284, which extends from the conductor X through the conductors 290 and 298, contact element 300 of the relay 286, conductors 302 and 304, the armature of the motor 284, a conductor 306, contact element 307 of the relay 286, and conductors 308, 310 and 296 to the conductor Y is completed.

The energization of the relay 286 also completes a circuit for the field winding 312 of the motor 284 which extends from the conductor X through conductors 290, 314 and 316, contact element 318 of the relay 286, a conductor 320, the field winding 312 of the motor 284, and conductor 296 to the conductor Y.

When the circuit control device 42 is actuated, the relay 288 is energized in a circuit which extends from the conductor X through conductors 290 and 321, the contact element of the circuit control device 42, a conductor 322, the winding of the relay 288, and conductors 294 and 296 to the conductor Y.

The energization of the relay 288 provides energization of the field winding of the motor 284 with the same polarity as that provided by the relay 286, and energization of the armature of the motor 284 with opposite polarity to that provided by the relay 286.

The field winding 312 of the motor 284 is energized by the relay 288 in a circuit which extends from the conductor X through the conductors 290 and 314, contact element 324 of the relay 288, conductors 326 and 320, the field winding 312 of the motor 284, and conductor 296 to the conductor Y.

The armature energizing circuit for the motor 284 which is completed by the relay 288 extends from the conductor X through the conductor 290, contact element 328 of the relay 288, conductors 330 and 306, the armature of the motor 284, conductors 304, 302 and 332, contact element 334 of the relay 288, and conductors 310 and 296 to the conductor Y.

A magnetically released brake 336 is provided for holding the armature of the motor 284 in a fixed position when it is not energized. The brake 336 comprises a solenoid 337 which is energized in parallel circuit relation with the armature of the motor 284, and is spring pressed by a spring member 338 in braking relation when the armature of the motor 284 is not energized.

The control system for actuating the solenoid 18 at the desired intervals, which comprises the relays 46, 48, 50, 52, 54, 56, 58, 60, 62 and 64, the limit switch 66, the relay 68, the selector switch 44 and their associated circuits, energizes the solenoid 18 through the actuation of the relay 68 in a circuit which extends from the conductor X through conductors 340 and 341, the winding of the solenoid 18, a conductor 342, contact element 344 of the relay 68, and conductors 346 and 347 to the conductor Y. The circuit for the relay 68 is completed by the relays 46, 48, 50, 52, 54, 56 and 58 through their contact elements 350, 352, 354, 356, 358, 360 and 362, respectively, when one of these contact elements, which is associated with the circuit selected by the movable selector contact element 364 of the selector switch 44, is actuated. When the selector contact element 364 is engaged with the contact element 366, the energization of the relay 46 will complete a circuit for the relay 68 which extends from the conductor X through conductors 348 and 368, contact element 364, the contact element 366, conductors 369 and 370, the contact element 350, conductors 372 and 348, the winding of the relay 68, and the conductor 347 to the conductor Y.

The circuit of the relay 68 will be completed by the relay 48 when the contact element 364 is in engagement with the contact element 374 in a circuit which extends from the conductor X through the conductors 340 and 368, contact elements 364 and 374, conductors 376 and 378, the contact element 352 of the relay 48, conductors 380, 372 and 348, the winding of the relay 68, and the conductor 347 to the conductor Y. When the contact element 364 is in engagement with the contact element 382, the contact element 354 of the relay 50 will complete the circuit for the relay 68 which extends from the conductor X through the conductors 340 and 368, contact elements 364 and 382, conductors 384 and 386, the contact element 354, conductors 388, 372 and 348, the winding of the relay 68, and the conductor 347 to the conductor Y. A similar circuit may be completed by the relay 52 when the contact element 364 is in engagement with the contact element 390, extending from the conductor X through the conductors 340 and 368, contact elements 364 and 390, conductors 392 and 394, the contact element 356 of the relay 52, conductors 396, 372 and 348, the winding of the relay 68, and the conductor 347 to the conductor Y.

The circuit for the relay 68 completed by the relay 54 with the contact element 364 in the position shown in the drawings extends from the conductor X through conductors 340 and 368, contact elements 364 and 398 of selector switch 44, conductors 400 and 402, the contact element 358 of the relay 54, conductors 404, 372 and 348, the winding of the relay 68 and the conductor 347 to the conductor Y. The relay 56 will complete a circuit for the relay 68 when the contact element 364 engages the contact element 406, extending from the conductor X through the conductors 340 and 368, contact elements 364 and 406, conductors 408 and 410, contact element 360 of the relay 56, conductors 412, 372 and 348, the winding of the relay 68, and the conductor 347 to the conductor Y. When the contact element 364 is in the seventh position in engagement with the contact element 414, or is out of engagement with all of the contact elements, the relay 58 will complete a circuit for the relay 68 extending from the conductor X through the conductor 340, the contact element 362 of the relay 58, the conductor 348, the winding of the relay 68, and the conductor 347 to the conductor Y.

The limit switch 66 which is driven by the carriage motor 12 is actuated to close its associated circuits during the desired portion of each forward motion of the saw carriage. The contact element 416 of the limit switch 66 engages its associated contact elements to complete energizing circuits for successive ones of the relays 46, 48, 50, 52, 54, 56 and 58 upon each forward motion of the carriage. The engagement of the contact element 416 with its associated contact elements completes a circuit for the relay 46 which extends from the conductor X through conductors 340, 418 and 420, the winding of the relay 46, conductors 422 and 424, contact element 426 of the relay 60 in the lower position, a conductor 428, contact element 430 of the relay 62 in the lower position, a conductor 432, contact element 434 of the relay 64 in the lower position, a conductor 436, the contact element 416, a conductor 438, contact element 440 of the relay 68, and conductors 442 and 347 to the conductor Y.

When the relay 46 is energized, its contact element 444 completes an energizing circuit for the relay 60 which will become effective to energize the relay 60 when the contact element 416 of the limit switch 66 becomes disengaged from its associated contact elements, and which will then form the energizing circuit for the relays 46 and 60 in a series circuit which extends from the conductor X through the conductors 340, 418 and 420, the winding of the relay 46, conductors 422 and 424, contact element 444 of the relay 46, conductors 446 and 448, the winding of the relay 60, a conductor 450, the contact element 452 of the relay 62, conductors 454, 456 and 458, the contact element 460 of the relay 68 and conductors 462 and 347 to the conductor Y.

The energization of the relays 46 and 60 sets up an energizing circuit for the relay 48 which is completed by the contact element 416 of the limit switch 66 upon the next forward reciprocation of the carriage 10 in a circuit which extends from the conductor X through the conductors 340, 418 and 464, the winding of the relay 48, conductors 466 and 468, contact element 470 of the relay 46, conductors 472 and 474, the contact element 426 of the relay 60 in the upper position, conductors 476 and 428, the contact element 430 in the lower position, the conductor 432, the contact element 434 in the lower position, the conductor 436, the contact element 416, the conductor 438, the contact element 440, and conductors 442 and 347 to the conductor Y.

When the relay 48 moves its contact element 478 to closed circuit position, it completes an energizing circuit for the relays 48 and 62 in series circuit relation which will be effective when the contact element 416 of the limit switch 66 disengages its associated contact elements, and which extends from the conductor X through the conductors 340, 418 and 464, the winding of the relay 48, the conductors 466 and 468, the contact element 478, conductors 480 and 482, the winding of the relay 62, a conductor 484, contact element 486 of the relay 64, conductors 488, 456 and 458, the contact element 460, and conductors 462 and 347 to the conductor Y. The energization of the relay 62 will cause its contact element 452 to move to open circuit position to thereby open the energizing circuit for the relays 46 and 60, and these relays will drop.

With the relays 48 and 62 energized, an energizing circuit will be provided for the relay 50 when contact members 416 of the limit switch 66 are again closed extending from the conductor X through the conductors 340, 418 and 490, the winding of the relay 50, conductors 492 and 494, contact element 496 of the relay 48, conductors 498 and 500, the contact element 430 of the relay 62 in the upper position, conductors 502 and 432, the contact element 434 of the relay 64 in the lower position, the conductor 436, the contact element 416 of the limit switch 66, the conductor 438, the contact element 440, and conductors 442 and 347 to the conductor Y.

The actuation of the relay 50 will close a circuit for energizing the relays 50 and 64 in series circuit relation which will be effective when the contact element 416 of the limit switch 66 has disengaged its associated contact elements, and which extends from the conductor X through the conductors 340, 418 and 490, the winding of the relay 50, conductors 492 and 494, contact element 504 of the relay 50, conductors 506 and 508, the winding of the relay 64, a conductor 510, contact element 512 of the relay 60, conductors 456 and 458, the contact element 460, and conductors 462 and 347 to the conductor Y. When the relay 64 is thus energized, its contact element 486 will move to open circuit position to thus deenergize the relays 62 and 48.

The next engagement of the contact element 416 of the limit switch 66 with its associated contact elements will close an energizing circuit for the relay 52 which extends from the conductor X through the conductors 340, 418 and 514, the winding of the relay 52, conductors 516 and 518, contact element 520 of the relay 50, conductors 522 and 524, the contact element 434 of the relay 64 in the upper position, conductors 526 and 436, the contact element 416, the conductor 438, the contact element 440, and conductors 442 and 347 to conductor Y.

The actuation of the relay 52 will close an energizing circuit for the relays 52 and 60 in series circuit relation which will be effective when the contact element 416 of the limit switch 66 has become disengaged from its associated contact elements, and which extends from the conductor X through the conductors 340, 418 and 514, the winding of relay 52, conductors 516 and 518, contact element 528 of the relay 52, the conductors 446 and 448, the winding of the relay 60, the conductor 450, the contact element 452, conductors 454, 456 and 458, the contact element 460, and the conductors 462 and 347 to conductor Y. The energization of the relay 60 will cause its contact element 512 to move to open circuit position to thereby deenergize the relays 64 and 50.

When the contact element 416 of the limit switch 66 next engages its associated contact elements, the relay 54 will be energized in a circuit which extends from the conductor X through the conductors 340, 418 and 532, the winding of the relay 54, conductors 534 and 536, contact element 538 of the relay 52, the conductors 472 and 474, the contact element 426 of the relay 60 in the upper position, the conductors 476 and 428, the contact element 430 of the relay 62 in the lower position, the conductor 432, the contact element 434 of the relay 64 in the lower position, the conductor 436, the contact element 416 of the limit switch 66, the conductor 438, the contact element 440 relay 68, and the conductors 442 and 347 to the conductor Y.

When the relay 54 is thus energized, its contact element 358 will be moved to closed circuit position to close the hereinbefore described energizing circuit for the relay 68 extending from the conductor X through the conductors 340 and 368, the contact elements 364 and 398 of selector switch 44, the conductors 400 and 402, the contact element 358 of the relay 54, the conductors 404, 372, and conductor 348, the winding of the relay 68, and the conductor 347 to the conductor Y.

When the relay 68 is energized, a holding circuit for the relay 68 will be established through a contact element 540 of the limit switch 66 which engages its associated contact elements slightly in advance of the engagement of the contact element 416 with its associated contact elements. This holding circuit extends from the conductor X through the conductors 340 and 542, the contact element 540 of the limit switch 66, a conductor 544, contact element 546 of the relay 68, conductors 548 and 348, the winding of the relay 68 and conductor 347 to the conductor Y.

The actuation of the relay 68 will cause its contact element 460 to move to open circuit position to thereby break the holding circuit for the relay 60 and prevent the relay 62 from being energized in series circuit with the relay 54. The relays 46, 48, 50, 52, 54, 56, 58, 60, 62 and 64 will, therefore, be returned to normal by the actuation of the relay 68, and the subsequent deenergization of the relay 68 when the contact elements 416 and 540 of the limit switch 66 become disengaged from their associated contact elements.

If at any time it is desired to make an emergency cut or a series of emergency cuts, the relay 70 may be energized by the manually operated contact device 72 in a circuit extending from the conductor X through conductors 340 and 550, the contact element of the circuit control device 72, a conductor 554, the winding of the relay 70, and conductors 556 and 347 to the conductor Y. The actuation of the relay 70 will cause its contact elements to provide shunting circuits between the stationary selector contact elements 366, 374, 382, 390, 398 and 406 of the selector switch 44 to thereby cause the relay 68, and consequently the solenoid 18, to be energized during the next forward motion of the carriage 10 after the actuation of the circuit control device 72.

The contact element 558 of the relay 70 will close a shunting circuit for the contact elements 366 and 374 extending from the contact element 366 through the conductor 369, the contact element 558, and conductors 560 and 376 to the contact element 374. A similar shunting circuit for the contact elements 374 and 382 extends from the contact element 374 through conductors 376 and 560, contact element 562, and conductors 564 and 384 to the contact element 382. A circuit extending from the contact element 382 through the conductors 384 and 564, contact element 566, and conductors 568 and 392 forms a shunting circuit for the contact elements 382 and 390, and a circuit extending from the contact element 390 through the conductors 392 and 568, contact element 570, conductors 572, 402 and 400 shunt the contact elements 390 and 398. Similarly, the contact element 574 of the relay 70 closes a shunting circuit between the contact elements 398 and 406 extending from the contact element 398 through the conductors 400, 402 and 572, contact element 574, and conductors 576, 410 and 408 to the contact element 406. The contact element 578 of the relay 70 connects all of these shunted contact elements to the conductor X through the circuit which extends from the conductor 576 through the contact element 578, and conductors 580 and 340 to the conductor X.

When it is desired to make a sample cut of the smallest unit length for the purpose of measuring the cut lengths or for any other purpose, the circuit control device 78 may be actuated, and this circuit control device, in conjunction with a contact element 582 on the limit switch 66, will actuate the relays 74 and 76 to so control the system as to cause the relay 68 and the solenoid 18 to be energized when it is actuated immediately following the next cut made by the saw as determined by the setting of the selector switch 44.

When the circuit control device 78 is actuated, the relay 76 will be energized through a circuit which extends from the conductor X through conductors 340 and 584, the contact element of the circuit control device 78, a conductor 586, contact element 588 of the relay 46, conductors 590, 592 and 594, contact element 596 of the relay 74, conductors 598 and 600, the winding of the relay 76, and conductors 602 and 347 to the conductor Y.

The actuation of the relay 76 will cause it to close its own holding circuit extending from the conductor X through conductors 340 and 604, contact element 606 of the relay 76, the conductors 592 and 594, the contact element 596, the conductors 598 and 600, the winding of the relay 76, and the conductors 602 and 347 to the conductor Y. When the contact element 582 next engages its associated contact element, it will close a further holding circuit for the relay 76 which extends from the conductor X through the conductors 340 and 604, the contact element 606, the conductor 592, the contact element 582, the conductors 598 and 600, the winding of the relay 76, and the conductors 602 and 347 to the conductor Y.

When the relay 46 is next energized by the engagement of the contact element 416 of the limit switch 66 with its associated contact elements as hereinbefore described, it will close an energizing circuit for the relay 74 which extends from the conductor X through the conductors 340, 604 and 608, contact element 610 of the relay 76, conductors 612 and 614, contact element 616 of the relay 46, a conductor 618, the winding of the relay 74, and conductors 620 and 347 to the conductor Y. The actuation of relay 74 closes its own holding circuit extending from conductor X through the conductors 340, 604 and 608, the contact element 610, the conductor 612, contact element 622, conductors 624 and 618, the winding of the relay 74, and the conductors 620 and 347 to the conductor Y. The actuation of the relay 74 will complete an energizing circuit for the relay 68 which extends from the conductor X through conductors 340 and 626, contact element 628 of the relay 74, conductors 630, 369 and 370, the contact element 350 of the relay 46, the conductors 372 and 348, the winding of the relay 68, and the conductor 347 to the conductor Y, thus causing the actuation of the solenoid 18. The actuation of the relay 68 will break the energizing circuit of the relay 74 by the movement of the contact element 440 of the relay 68 to open circuit position, but the relay 74 will be held energized through its holding circuit described hereinbefore.

When the contact element 582 of the limit switch 66 becomes disengaged from its associated contact elements, the holding circuit for the relay 76 hereinbefore described will be broken, the relay 76 will drop out, and the holding circuit of the relay 74 will be opened by the movement of the contact element 610 of the relay 76 to open circuit position. The system will thus be returned to normal to continue cutting the normal lengths of pipe which are multiples of the unit cut length, as determined by the setting of the selector switch 44.

In the operation of the device, the motor 12 will operate continuously to cause continuous reciprocation of the carriage 10 and the saw 4 mounted thereon parallel with the motion of the pipe 6 as it is delivered from the mill 8. The setting of the regulator 24, together with the adjustment of the linkage 14, will be such as to maintain a speed relation between the mill motor 9 and the carriage motor 12 which will produce a motion of the saw 4 as it is moved in the direction of motion of the pipe 6, which has the same speed as the pipe 6 during a portion of the motion in that direction. If for any reason there is a variation in the relation of the speeds of the motors 9 and 12, the cone pulleys 170 and 176 will be rotated at different speeds, and the differential movement will be transmitted to the variable resistor 154 which will so change the excitation of the exciter 148 as to vary the speed of the motor 12 to restore the proper speed relation between the motor 9 and the motor 12.

It will be seen that with a fixed speed relation between the motor 9 and the motor 12, and with the linkage so adjusted as to cause the saw 4 to have the same speed as the pipe 6 in the forward direction of motion of the saw 4, the saw 4 would cut off equal lengths of pipe if it were actuated upon each forward motion of the carriage 10. If it is desired that this unit length be varied, it is only necessary to close the selector switch 30 in the left-hand position, and selectively actuate the circuit control devices 26 and 28 to cause the motor 16 to change the position of the block 114 and thus vary the effective radius of the lever 108. At the same time, the synchro-tie system will transmit the motion of the motor 16 to the cam 182 which will so vary the setting of the regulator 24 as to establish a new speed relation between the mill motor 9 and the carriage motor 12 which will cause the motor 12 to drive the saw carriage 10 at a greater or less frequency of reciprocation, depending upon the direction in which the radius of the lever 108 has been varied. Thus, for each desired cut length, there will be a definite frequency of reciprocation of the saw carriage 10 with respect to the speed of the pipe 6, and the effective length of the lever 108 will have a definite setting which will produce a speed of the saw carriage 10 in the direction of movement of the pipe 6 equal to the speed of the pipe 6.

By the actuation of the manually operable limit switch 32 by the handwheel 264 while the selector switch 30 is in the right-hand position, the handwheel 264 may be turned to the position where the desired cut length is indicated on the dial 266 by the pointer 268. The mechanism will then automatically adjust the speed of the carriage motor 12 and the effective length of the lever 108 as hereinbefore described to give the cut length indicated on the dial 266 by the pointer 268. In the event that minor adjustments of the relative speeds of the mill motor 9 and the saw carriage motor 12 are necessary, the phase-shifting synchro-tie unit 38 may be actuated by the selective actuation of the circuit control devices 40 and 42 to adjust the regulator 24 as desired. A similar adjustment may be made by hand by the actuation of the guide member 185 by the hand lever 186.

The selector switch 44 may be set with its movable contact element 364 in engagement with any of its associated fixed contact elements to actuate the cam follower operating solenoid 18 to cause the saw 4 to make cuts at any desired regular, successive multiple of the reciprocation of the saw. Thus, if the contact element 364 is actuated into engagement with the contact element 366, the saw will make a cut during its forward motion on each reciprocation of the saw carriage 10. If the contact element 364 is actuated into engagement with the contact element 398, as shown, the system will function as hereinbefore described to cause the saw to make a cut during the forward motion of the saw on every fifth reciprocation of the saw carriage 10. If the contact element 364 is placed into engagement with the contact element 406, or into engagement with the contact element 414, or out of engagement with all of the fixed contact elements of the selector switch 44, the relays 56 and 58 will function in connection with the relays 62 and 64 respectively, to make a cut on every sixth or seventh reciprocation of the saw carriage 10 in the manner set forth in the detailed description of the operation of the relay 54 in conjunction with the relay 60 to make a cut on every fifth reciprocation.

Thus, if it is desired to cut the pipe into lengths of 32½ feet, the movable contact element 364 of the selector switch 44 will be placed into engagement with the fifth contact element 398 as indicated, and the unit cut length may be adjusted by the selectable control devices 26 and 28 or by the manually operable limit switch 32, which may be set by the handwheel 264 to give a unit cut length of 6½ feet. Thus, with the unit cut length of 6½ feet, and the saw making a cut every fifth receprocation, the length of the cut sections of pipe will be equal to 32½ feet. By a similar adjustment, any length of pipe may be cut within the range between the minimum unit cut length and seven times the maximum unit cut length. It is to be understood, however, that the selector switch 44 in the relay system is shown as being capable of selecting only seven multiples of the cut length by way of illustration, and that the system may be extended to any desired number of multiples of the cut length by the extension of the relay system following the principles of the system as described in detail hereinbefore.

If emergencies should arise which would make it desirable to cut the pipe as fast as it is fed from the mill, or if for any reason it should be desired to cut the pipe into short lengths without setting the selector switch 44, the emergency cut relay 70 may be actuated by the circuit control device 72 as described hereinbefore, and the minimum cut length for which the saw is set will be cut continuously so long as the circuit control device is actuated, and when it is released the saw will resume cutting the lengths of pipe which are multiples of the unit length selected by the selector switch 44.

While the saw is operating, it may be desirable periodically to cut a unit length of pipe as a sample to be measured as a check upon the setting of the saw. This may be done by the momentary actuation of the circuit control device 78 which will cause the saw to cut a single unit length following the next regular cut, and then resume the regular lengths of cut which are multiples of the unit length for which the saw is adjusted as fully described hereinbefore.

It is to be understood that the saw which acts upon the pipe 6 is merely illustrative of a device which may be made to act upon the pipe at regular selectable distances along the pipe, and that the pipe 6 is merely illustrative of a moving length of material which may be acted upon by such a device. It is to be understood that any device for acting upon any length of material may be operated by the mechanism disclosed herein, and that the mechanism may be such as would act upon any length of material at regular distances along the material in any manner desired. An example of a device that may be so operated is a marking device which may be mounted upon the platform 80 in place of the saw 4, and which may be made to mark a length of material, such as the pipe 6, or a rod or sheet of material, as it is continually fed from a mechanism, such as the mill 8, or any other similar work device.

Thus it will be seen that I have provided a control system for a device for operating upon a moving length of material which shall function to cause the device to automatically act upon the length of material at any desired preselectable, regular, successive lengths along the material, which may be made to act upon the material after any of the regular preselected lengths of materials have been acted upon, and which may be made to act upon the material at shorter intervals than at the preselected lengths in an emergency such as would make it undesirable to continue to act upon the material at the preselected lengths.

In compliance with the requirements of the patent statutes, I have shown and described herein a preferred embodiment of my invention. It is to be understood, however, that the invention is not limited to the precise construction shown and described herein, but is capable of modification by one skilled in the art, the embodiment shown herein being merely illustrative of the principles of my invention.

I claim as my invention:

1. A control system for an electro-responsive control means operable to effect an operation comprising, an energizing circuit for the electro-responsive means, a plurality of electrical control circuits, selectively-operable switch means having contact members individually connected in said control circuits for partially closing any desired one of said circuits, a plurality of counting relays each associated with a separate one of said circuits and having contact members individually connected therein for completing the selected circuit when the counting relay associated with the selected circuit is actuated, circuit means including a limit switch adapted to be actuated through a series of identical cycles and having contact members which are closed during a portion of each cycle only for effecting the successive operation of said counting relays, and relay means connected to be energized in response to the completion of the selected control circuit and having contact members connected to close the energizing circuit of the electro-responsive control means, said relay means having normally closed contact members connected in said circuit means including the limit switch which function when said relay means is operated to de-energize any of the counting relays which have been energized to render them effective to repeat the counting operation to provide another operation of the relay means.

2. A control system for an electro-responsive control means operable to effect a predetermined operation comprising, an energizing circuit for said electro-responsive control means, a plurality of electrical control circuits, selectively-operable switch means having a plurality of contact members individually connected in said control circuits for selecting and partially closing any desired one of said control circuits, a plurality of counting relays each associated with a separate one of said control circuits and having contact members individually connected in said control circuits for completing the selected control circuit when the particular counting relay associated with the selected control circuit is actuated, circuit means including a limit switch adapted to be actuated through a series of identical cycles and having contact members which are closed for a portion of each cycle only for effecting the energization and operation of the counting relays successively, relay means connected to be energized in response to the completion of any one of the selected control circuits for closing the energizing circuit of the electro-responsive means, and manually actuable switch means having contact members individually connected in parallel with the contact members of the selectively-operable switch means and operable at will to partially close all of said plurality of control circuits independently of the selectively operable switch means to thereby cause the said relay means to be operated to energize the electro-responsive means in response to the operation of the next succeeding counting relay after the actuation of said manually actuable switch means.

3. In a control system for an electro-responsive control means for effecting a predetermined operation comprising, an energizing circuit for said electro-responsive control means, a plurality of electrical control circuits, selector switch means having a plurality of contact members individually connecting in said control circuits for selecting and partially closing any desired one of said control circuits, a chain of counting relays each associated with a separate one of said control circuits and having contact members individually connected in said control circuits for finally completing the selected control circuit when the counting relay associated with the selected control circuit is actuated, circuit means including a limit switch adapted to be actuated through a series of identical cycles and having contact members which are closed for a portion of each cycle only for effecting the operation of the counting relays successively, relay means connected to be energized in response to the completion of any one of the selected control circuits for closing the energizing circuit of the electro-responsive means, said relay means having normally closed contact members connected in said circuit means and being effective when energized and operated to deenergize any of said counting relays which have been energized to render the counting relays and their associated circuit means effective to repeat the counting operation, and manual switch means operable at will and having contact members connected in parallel with the contact members of the selector switch means connected in the control circuit individual to the first counting relay for partially closing said control circuit independently of the selector switch means to effect the operation of the first counting relay of the chain immediately following the operation of the last relay of the chain as determined by the setting of the selector switch means which operates to complete the selected control circuit, thereby to complete the control circuit associated with said first counting relay and again effect the operation of the relay means.

4. A control system for an electro-responsive means operable to effect a predetermined operation comprising, an energizing circuit for said electro-responsive means, a plurality of electrical control circuits, selectively-operable switch means having a plurality of contact members individually connected in said control circuits for partially closing any desired one of said control circuits, a chain of counting relays each associated with a separate one of said control circuits and having contact members individually connected in said control circuits for finally completing the selected control circuit when the counting relay associated with the selected control circuit is actuated, circuit means including a limit switch adapted to be driven through a series of identical operating cycles and having contact members which are closed for a portion of each cycle only for effecting the operation of the counting relays successively, a control relay connected to be energized in response to the completion of any one of the selected control circuits for closing the energizing circuit of the electro-responsive control means, said control relay having normally closed contact members connected in said circuit means and being effective when so operated to deenergize any of said counting relays which have been energized to render the counting relays and their associated circuit means effective to repeat the counting operation, a first manually operable switch means having contact members individually connected in parallel with the contact members of the selectively operable switch means and operable at will for partially closing all of said control circuits independently of the selectively operable switch means to thereby effect the operation of the control relay in response to the operation of next succeeding counting relay after said first manually operable switch means is actuated, and a second manually operable switch means operable at will and having contact members connected in parallel with the contact members of the selector switch means connected in the control circuit individual to the first counting relay for partially closing the control circuit individual to the first counting of the chain independently of the selectively operable switch means to thereby effect the operation of the control relay at the beginning of the next succeeding cycle of operation of the counting relays following the completion of the cycle in which said second manually operable switch means is actuated.

5. In combination, a control relay having an operating winding, a plurality of normally open control circuits connected in parallel to said operating winding for energizing said relay, selector switch means having contact members individually connected in said control circuits operable to select and partially close any desired one of the control circuits, a chain of counting relays each relay of the chain being individual to one of the control circuits and having contact members connected therein and operable to finally complete its associated circuit after such circuit has been selected and partially closed by said selector switch means, circuit means including a limit switch adapted to be successively operated through identical operating cycles and having contact members which are closed for a portion of each cycle only for controlling the energization of the counting relays to effect a sequential operation thereof, and additional circuit means including manually operable switch means operable at will and effective when operated during any cycle of operation of the limit switch to partially close all of said control circuits to render the next counting relay thereafter operated effective to operate the control relay regardless of the setting of the selector switch means.

6. In combination, a control relay having an operating winding, a plurality of normally open control circuits connected in parallel to said operating winding for energizing said relay, selector switch means having a plurality of operating positions and contact members individually connected in said control circuits operable to select and partially close any desired one of the control circuits, a chain of counting relays each relay being individual to a control circuit and having contact members connected therein and operable to complete the selected and partially closed control circuit when the relay individual to that circuit is actuated, circuit means including a limit switch adapted to be operated through a series of identical cycles and having contact members closed during a portion of each cycle only for controlling the energization of the counting relays to effect their sequential operation in accordance with the operating cycles of the limit switch, and additional circuit means including manually operable switch means operable at will and having contact members connected to partially complete the control circuit individual to the first counting relay of the chain independently of the selector switch means to effect the operation of the control relay in response to the operation of said first counting relay regardless of the setting of the selector switch means.

7. In combination, a control relay having an operating winding, a plurality of normally open electrical circuits connected in parallel to said operating winding for energizing said relay, selectively operable switch means having contact members individually connected in said electrical circuits and operable to select any one of said circuits by effecting a partial closure thereof, a plurality of counting relays each associated with a separate one of said circuits and each having contact members individually connected therein and operable to complete the selected circuit when the counting relay associated with that circuit is actuated, and circuit means including a control switch operable through successive operating cycles and having contact members closed during a portion of each cycle only for controlling the energization of said counting relays to effect the operation of successive ones of said counting relays during each cycle of operation of the control switch, whereby the control relay is operated in response to the operation of the particular counting relay associated with the selected electrical circuit.

8. In combination, a control relay having an operating winding, an energizing circuit connected to the operating winding of the control relay having a plurality of parallel branch portions, a manually operable selector switch having a contact element individual to and connected in each of said branch portions for preselecting by partially completing the particular branch portion to be finally completed to effect the operation of the control relay, a plurality of counting relays each individual to a branch portion and having contact members individually connected therein and operable to complete the energizing circuit of the control relay, circuit means interconnecting said relays for sequential operation, and switch means adapted to be operated through successive cycles and having contact members closed during a portion of each cycle only connected in said circuit means for controlling the energization of said circuit means, thereby to effect the operation of the control relay in response to the operation of a particular one of the counting relays individual to the branch portion partially completed by the selector switch.

9. In combination, a control relay having an operating winding, an energizing circuit connected to the operating winding and having a plurality of parallel branches, a chain of counting relays for controlling the operation of the control relay, said relays being individual to each branch portion of the energizing circuit and having contact members connected therein, a selector switch having a plurality of operating positions and contact members individually connected in said branches for determining which one of the counting relays of the chain is effective to close the energizing circuit and effect the operation of the control relay, circuit means interconnecting the counting relays to effect a sequential operation thereof in response to successive energizations of the circuit means, and switch means having contact members connected in said circuit means operable through identical successive cycles for effecting the successive energization of said circuit means.

10. In combination, a control relay having an operating winding, a plurality of energizing circuits connected to the operating winding, a selector switch having an operating position individual to each of said operating circuits and contact members individually connected therein for preselecting the particular circuit to be energized by partially closing the circuit, a plurality of counting relays each individual to one of said operating circuits and having contact members connected therein operable to complete the particular circuit selected by the selector switch, circuit means interconnecting said counting relays for sequential operation, and switch means having contact members connected with said circuit means and operable through successive cycles of operation for controlling the energization and operation of the counting relays, thereby to effect the operation of the control relay in response to the operation of any one of the counting relays as determined by the setting of the selector switch.

11. In combination, a control relay having an operating coil, a selector switch operable to a plurality of different operating positions and having contact members which are individually closed in each position, switch means adapted to be driven through successive identical cycles and having contact members which are closed during a portion of each cycle, a chain of counting relays, said counting relays having operating coils and associated contact members, circuit means interconnecting the contact members of said switch means and the operating coils of the counting relays for operating the relays of the chain in sequence in accordance with the cyclic operation of the switch means, and additional circuit means interconnecting the contact members of the selector switch with the contact members of the counting relays and operating coil of the control relay for selectively rendering said counting relays effective to operate the control relay during one of the operating cycles of the switch means as determined by the setting of the selector switch.

12. In an electrical control system for effecting the operation of an electro-responsive device comprising, an energizing circuit for the electro-responsive device, a plurality of electrical control circuits, selectively operable switch means operable to a plurality of different control positions and having contact members which are closed at each position for partially completing any desired one of said circuits at a time, a plurality of counting relays each individually associated with one of said control circuits and the control positions of said switch means, said counting relays having contact members individually connected in said control circuits and being operable to partially complete their individual control circuits, whereby the particular control circuit that is finally completed is dependent upon the closure of the particular counting relay individual to the control position to which said switch means is operated, circuit means including a limit switch adapted to be operated through successive identical cycles and having contact members which are closed during a portion of each cycle only for effecting the sequential operation of the counting relays, and a control relay having an operating winding connected to said control circuits to be operated in response to the said final completion of any one of said control circuits for closing the energizing circuit of the electro-responsive device.

13. An electrical system for use in controlling the operation of an electro-responsive device comprising, an energizing circuit for the electro-responsive device, a control relay having contact members connected to close said circuit to effect operation of the electro-responsive device, an energizing circuit connected to operate the control relay, said circuit having a plurality of parallel branch portions, a selector switch operable to a plurality of different control positions and having contact members individually connected in each branch portion for partially completing said circuit, a plurality of counting relays associated with the selector switch and each having contact members in each branch portion and effective depending upon the position of the selector switch to complete the energizing circuit for the control relay, and circuit means including a plurality of sequence relays and a limit switch adapted to be operated through successive identical cycles and having contact members which are closed during a portion of each cycle only for effecting the sequential operation of the counting relays, thereby to effect the operation of the control relay in a particular operating cycle of the limit switch as determined by the position of the selector switch.

14. An electrical system for use in controlling the operation of an electro-responsive device comprising, an energizing circuit for the electro-responsive device, a control relay having contact members connected to close said circuit to effect the energization of the electro-responsive device, an energizing circuit connected to operate the control relay, said circuit having a plurality of parallel branch portions, a manually actuated selector switch operable to a plurality of different control positions and having contact members connected in each branch portion for partially completing said circuit, a plurality of counting relays individually associated with the control positions of the selector switch and each having contact members connected in each branch portion operable depending upon the position to which the selector switch is operated to complete the energizing circuit for the control relay, and circuit means including a plurality of sequence relays and a limit switch adapted to be operated through successive identical cycles and having contact members which are closed during a portion of each cycle only for effecting the sequential operation of the counting relays to effect the operation of the control relay in a particular cycle of the limit switch as determined by the position of the selector switch, thereby to provide for effecting successive operations of the electro-responsive device.

15. An electrical system for use in controlling the operation of an electro-responsive device comprising, an energizing circuit for the electro-responsive device, a control relay having contact members connected to close said circuit to effect energization of the electro-responsive device, an energizing circuit for the control relay, relay means operable in sequence for partially closing the energizing circuit of the control relay, said relay means comprising a plurality of counting relays each having contact members connected to partially close said circuit, circuit means including a limit switch adapted to be driven through successive identical operating cycles and having contact members which are closed during a portion of each cycle only for effecting a sequential operation of the counting relays whereby said relays function to partially complete an energizing circuit for the control relay each time the limit switch is operated through its operating cycle, and a selector switch operable to be set in different positions and having contact members connected in the energizing circuit of the control relay cooperative with the counting relays to finally complete the energizing circuit for the control relay in any operating cycle of the limit switch as determined by the position of the selector switch, thereby to provide for effecting the operation of the electro-responsive device depending upon the particular operating cycle in which the control relay is energized.

16. An electrical system for use in controlling the operation of an electro-responsive device, comprising, an energizing circuit for the electro-responsive device, a control relay having contact members connected to close said circuit to control the energization of the electro-responsive means, an energizing circuit connected to the operating winding of said control relay, a plurality of relays including a chain of counting relays having contact members connected in the energizing circuit of the control relay in parallel circuit relation and operable in sequence through a predetermined cycle to partially complete the energizing circuit for the control relay each time one of the counting relays is operated to its closed position, circuit means including switch means adapted to be driven through a series of identical cycles and having contact members which are closed during a portion of each cycle only for effecting the sequential operation of the counting relays at a predetermined point in each cycle of operation of said switch means, and a manually-operable selector switch operable to different control positions and having contact members connected indvidually in series circuit relation with the contact members of said counting relays to effect completion of any one of said partially established energizing circuits for the control relay depending upon the setting of the selector switch, whereby the control relay is energized at said predetermined point in the operating cycle of the switch means in the particular cycle as determined by the setting of the selector switch.

WILLARD G. COOK.

REFERENCES CITED

The following references are of record in the file of this patent:

UNITED STATES PATENTS

| Number | Name | Date |
| --- | --- | --- |
| 1,037,675 | Simpson | Sept. 3, 1912 |
| 1,549,429 | Bartlett | Aug. 11, 1925 |
| 1,647,337 | Bradshaw | Nov. 1, 1927 |
| 1,668,777 | Martersteck | May 8, 1928 |
| 1,684,617 | Biggert | Sept. 18, 1928 |
| 1,894,815 | Biggert | Jan. 17, 1933 |
| 1,946,926 | Barton | Feb. 13, 1934 |
| 1,996,617 | Hahn | Apr. 2, 1935 |
| 2,023,243 | Rhea | Dec. 3, 1935 |
| 2,079,974 | Traut | May 11, 1937 |
| 2,144,308 | Hallden | Jan. 17, 1939 |